(12) United States Patent
Blaser et al.

(10) Patent No.: US 8,028,977 B2
(45) Date of Patent: Oct. 4, 2011

(54) DEVICE FOR SUPPORTING PLATE-LIKE MATERIALS FOR AT LEAST ONE SEPARATING PROCESS

(75) Inventors: Martin Blaser, Vogt (DE); Daniel Graf, Ditzingen (DE); Eberhard Wahl, Weilheim (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 812 days.

(21) Appl. No.: 12/043,448

(22) Filed: Mar. 6, 2008

(65) Prior Publication Data
US 2008/0210516 A1 Sep. 4, 2008

Related U.S. Application Data

(63) Continuation of application No. PCT/EP2005/009550, filed on Sep. 6, 2005.

(51) Int. Cl.
*B25B 11/00* (2006.01)
(52) U.S. Cl. ....... 269/21; 269/289 R; 269/266; 269/900; 451/504; 451/40; 451/36; 277/355
(58) Field of Classification Search ............. 269/289 R, 269/266, 900; 451/504, 505, 40, 36, 87; 83/53, 177, 428, 435; 277/355, 500, 907
See application file for complete search history.

(56) References Cited

U.S. PATENT DOCUMENTS

| | | | | |
|---|---|---|---|---|
| 3,171,334 A | * | 3/1965 | Rasmussen | 92/165 R |
| 3,587,381 A | * | 6/1971 | Sederberg | 83/424 |
| 3,877,334 A | * | 4/1975 | Gerber | 83/22 |
| 4,092,889 A | * | 6/1978 | Fisher | 83/177 |
| 4,501,182 A | * | 2/1985 | Jardat et al. | 83/177 |
| 4,684,113 A | * | 8/1987 | Douglas et al. | 269/21 |
| 4,787,178 A | * | 11/1988 | Morgan et al. | 451/81 |
| 5,042,365 A | * | 8/1991 | Rosman | 92/192 |
| 5,152,707 A | * | 10/1992 | Dougherty et al. | 445/52 |
| 5,230,184 A | * | 7/1993 | Bukhman | 451/41 |
| 5,261,305 A | * | 11/1993 | Nasu | 83/427 |
| 5,718,620 A | * | 2/1998 | Tanaka et al. | 451/288 |
| 5,842,690 A | * | 12/1998 | Lee et al. | 269/21 |
| 6,358,119 B1 | * | 3/2002 | Shih et al. | 451/36 |
| 6,497,403 B2 | * | 12/2002 | Ries | 269/266 |

(Continued)

FOREIGN PATENT DOCUMENTS

JP 02232199 A * 9/1990

(Continued)

OTHER PUBLICATIONS

International Search Report from corresponding PCT Application Serial No. PCT/EP2005/009550, mailed May 29, 2006, 6 pages.

(Continued)

*Primary Examiner* — George Nguyen
(74) *Attorney, Agent, or Firm* — Fish & Richardson P.C.

(57) ABSTRACT

The invention relates to a device for supporting sheet-like materials for at least one separating process in the sheet-like materials, with at least one jet cutter device which may be displaced in the Y-direction during a separation process, with a first and second support surface together forming a support table for supporting the sheet-like material and with a jet trapping device, arranged between the first and second support surfaces and provided to be able to be displaced in the X-direction. The first and the second support surfaces are made from a flexible material forming part of at least one enclosed chamber, filled with a gas under pressure.

33 Claims, 6 Drawing Sheets

U.S. PATENT DOCUMENTS

| | | | |
|---|---|---|---|
| 6,742,782 B2 * | 6/2004 | Beichl | 277/409 |
| 7,282,665 B2 * | 10/2007 | Chen et al. | 219/121.67 |
| 7,419,164 B2 * | 9/2008 | Awtar et al. | 277/418 |
| 2002/0130469 A1 * | 9/2002 | Kono | 277/355 |

FOREIGN PATENT DOCUMENTS

| | | |
|---|---|---|
| JP | 03178800 A * | 8/1991 |
| JP | 04-091884 | 3/1992 |
| JP | 200153427 | 6/2000 |
| WO | WO 03/016004 | 2/2003 |

OTHER PUBLICATIONS

Translation of International Preliminary Report on Patentability from corresponding PCT Application No. PCT/EP2005/009550, issued Apr. 8, 2008, 5 pages.

* cited by examiner

Fig. 12 though such a device permits stiffening of the supporting surface, as viewed in the longitudinal axis of the tubes, for supporting heavy workpieces of large area, there is likewise the disadvantage that, in the traverse direction of a beam-catching device arranged between the supporting surfaces, a deflection of the supporting surface may occur. As a result, the processing point may be adversely affected.

DEVICE FOR SUPPORTING PLATE-LIKE MATERIALS FOR AT LEAST ONE SEPARATING PROCESS

CROSS REFERENCE TO RELATED APPLICATION

This application is a continuation of and claims priority under 35 U.S.C. §120 to PCT Application No. PCT/EP2005/009550, filed on Sep. 6, 2005. The contents of this priority application is hereby incorporated by reference in its entirety.

TECHNICAL FIELD

The invention relates to a device for supporting plate-like materials for at least one separating process in the plate-like material, having a cutting beam arrangement, movable at least in the Y direction during the separating process, of a processing machine, according to the preamble of claim 1.

BACKGROUND

JP 4-91884 discloses a laser processing machine which comprises a device for supporting plate-like materials for at least one separating process in the plate-like material. The plate-like material is processed by a cutting beam arrangement. The plate-like material rests on a supporting table which comprises a first and a second supporting surface, between which a beam-catching device is provided. A cutting beam discharging downward during the processing of the plate-like material is received by the beam-catching device, such that the band-shaped material which is used for forming the first and the second supporting surface is not damaged. In this device, a housing is moved relative to fixed deflection axes of the band-shaped material via an electric motor, as a result of which the supporting surfaces are variable in size, such that the entire region of the plate-like material is available for processing by the cutting beam arrangement, and the beam-catching device is positioned below a cutting head of the cutting beam arrangement.

This device is designed for small and light sizes of the plate-like material. In addition, tilting or impairment of the position of the plate-like material may occur on account of a deflection of the band-shaped supporting surface.

JP 2000-153427 has disclosed a laser processing machine which has a device for supporting plate-like materials for at least one separating process in the plate-like material, in which device the first and the second supporting surface are formed by tubes which are arranged in parallel next to one another and are connected at their respective outer sides to a chain. Although such a device permits stiffening of the supporting surface, as viewed in the longitudinal axis of the tubes, for supporting heavy workpieces of large area, there is likewise the disadvantage that, in the traverse direction of a beam-catching device arranged between the supporting surfaces, a deflection of the supporting surface may occur. As a result, the processing point may be adversely affected.

Furthermore, WO 03/016004 A1 discloses a device for mounting planar material for at least one separating process in the plate-like material by means of a cutting beam arrangement. This device has a chain link belt which is carried by telescopic arms which determine the size of the first and the second supporting surface as a function of their stroke movement. Due to the configuration of horizontally extending telescopic arms, this device is restricted in the maximum load bearing capacity and in the size of the supporting surface. In addition, an arrangement and incorporation of a beam-catching device is not provided.

The devices according to JP 2000-153427 and WO 03/016004 A1 both have the disadvantage that the supporting surface is not completely closed due to the formation of chain links. As a result, there is the risk of good parts and remnants becoming caught on the supporting surface.

SUMMARY

In one aspect, the present disclosure features a device for supporting plate-like materials for at least one separating process in the plate-like material, which enables the configuration of a large-area supporting table consisting of two supporting surfaces and a beam-catching device arranged in between in a traversable manner.

The configuration of at least one closed space having a flexible material which forms the first and the second supporting table and is a component part of the closed space, which is filled with a gaseous medium under pressure, makes it possible for sagging or deflection of the first and the second supporting surface on account of an internal pressure acting in at least one closed space to be countered. This enables very large supporting surfaces for also supporting heavy workpieces or plate-like materials. At the same time, it is ensured that the plate-like material, during the traverse of the beam-catching device, as a result of which the size of the first supporting surface changes relative to the second supporting surface, retains its orientation of the supporting plane, such that there are uniform conditions during the processing. As a result, the quality of the cutting gap and the precision in the production of good parts are increased.

According to an advantageous configuration of the invention, provision is made for the flexible material to be designed as a band whose outer marginal region closes a basic housing, open at the top, for building up an internal pressure. The basic housing and the flexible material form the closed space, it additionally being possible for a lid to be provided on the basic housing. This provides for a simple design. The flexible material can be pressed by the internal pressure against the supported plate-like material and can form full-surface support.

Provision is preferably made for an internal pressure in the closed space to be detectable by a pressure-measuring instrument, and in particular for pressure regulation for setting the internal pressure at least as a function of the plate-like material and of the thickness of the latter to be provided. As a result, adaptation to different processing tasks and changing working conditions, such as temperature changes for example, for the plane-parallel bearing of the plate-like material on the supporting surfaces is possible. Due to the pressure regulation, which comprises at least a controller and a pressure-measuring instrument, equilibrium between supported load and internal pressure can be created in order to permit the plane-parallel bearing.

To traverse the beam-catching device arranged between the first and the second supporting surface, provision is preferably made for the flexible material arranged statically relative to the basic housing to be passed through and deflected below the beam-catching device. As a result, a type of advancing wave is produced during the traverse of the beam-catching device, in the course of which the flexible material forming the supporting surfaces remains at rest. The beam-catching device follows up the cutting head in the X direction or is coupled to its drive. The flexible material is preferably passed through a gap which is formed at least in sections relative to the beam-catching device and which is formed by a forming element or by deflection rollers and forms a deflection region. This can provide for defined guidance or positive deflection of the flexible material.

Furthermore, provision is preferably made for low-friction elements to be provided between the forming element and the flexible material and/or between an outer contour of the beam-catching device and the deflected flexible material and/or between an end face of the beam-catching device and a plate-like material resting on the supporting surface. These low-friction elements may be designed as free-running or driven roller elements, brush elements, sliding materials, sliding coatings or as an air film bed. This makes it possible for the beam-catching device to be movable with reduced friction and for the plate-like material to retain its position, assumed once, on the supporting table.

Provision is preferably made for the housing of the beam-catching device to have a bell-shaped outer contour, thereby enabling a soft wave of the flexible material to be formed during the deflection, thereby providing for smooth-running displaceability of the beam-catching device relative to the flexible material.

A multi-piece basic housing which forms together with the flexible material a closed space is preferably provided, the multi-piece basic housing comprising a static seal at the interfaces. As a result, the basic housing can be protected against pressure loss. A welded, adhesively bonded or clamped construction is preferably provided. Grooves having a rubber seal, foam rubber seal or cord seals or the like may likewise be provided.

According to a further advantageous configuration of the invention, provision is made for the end faces of the flexible material to be fastened to the housing under pretension, preferably by a tensioning device. This provides for setting of the band tension as a function of different temperatures. In addition, the device can be adapted to the weight of the plate-like material or workpiece.

According to a further advantageous configuration of the invention, provision is made for a lateral seal of the longitudinal edges, running in the X and/or Y direction, of the flexible material to be provided by a seal which is detachably arranged on the basic housing and which is formed preferably by flocking and/or a foam rubber, a hook and loop fastener material (e.g., a strip of Velcro® fastener material), vacuum suction or mechanical clamping. The flexible material is held relative to the housing by a lid which extends at least slightly in the direction of the supporting surface. The lid is preferably designed as a frame with respect to the supporting surfaces. This lid is, for example, of magnetic design in the marginal region, such that the flexible material, which in a preferred embodiment comprises at least one magnetic component part, bears against and is held on an underside of the lid. In addition, the flexible material is pressed against the underside by the internal pressure. As a result, a detachable seal can be effected. At the same time, this seal can be inserted adjacent to the tensioning device and seal off the respective end faces.

Alternatively, the lateral seal may be provided by a hook-and-loop tape. Furthermore, vacuum suction which positions the flexible band in a detachable manner relative to the underside of the lid may be arranged in the lid. Mechanical clamping which is actuated in regions by actuators in order to realize a detachable arrangement may likewise be provided. In addition, sealing elements, such as, for example, flocking, polytetrafluoroethylene (PTFE) sealing strips (e.g., of Teflon® fluoropolymer resin), rubber or foam rubber, may be provided between the lid and the marginal region, bearing against the underside, of the flexible material.

According to a further advantageous configuration of the invention, provision is made for the flexible material to comprise, in the deflection region, a dynamic seal which is preferably formed by a flock bed, a sliding sealing means, such as a PTFE sliding seal for example, or graphite elements. This dynamic seal is likewise formed in the lateral marginal region, for example by means of a flocked gap which is formed by the guide element relative to the housing of the beam-catching device. This provides for a virtually gapless transition from the lateral seal of the flexible band at the underside of a lid to the dynamic seal in the deflection region.

According to a further advantageous configuration of the invention, a drive unit is provided in the closed space, said drive unit acting on the beam-catching device or a component arranged thereon. As a result, a compact device can be provided which accommodates all the components within a basic housing for forming the closed space.

Alternatively, provision may be made for at least one drive and/or guide element which acts on the beam-catching device or a component arranged thereon to be led out of the closed space and to be connected to a drive motor provided outside the closed space. This embodiment permits at least a simple exchange of the drive motors. Furthermore, provision may alternatively be made for it to be possible to provide a non-contact force transmission, for example by means of a magnetic coupling. As a result, overload protection is provided at the same time.

According to a further alternative configuration of the invention, provision is made for a lateral rolling band seal which in particular closes off a lateral guide gap for the traverse of the beam-catching device to be provided. Such a rolling band seal enables a plate, a bar or the like to be led out, by means of which the beam-catching device can be moved back and forth. Sealing of the guide gap is effected by means of the rolling band seal, which in particular is guided in a flock bed.

According to a further preferred configuration of the invention, provision is made for cooling of the supporting surfaces to be provided, in particular by gas circulation, spray cooling, water flooding or at least by cooling elements arranged on the beam-catching device and moved along with the latter. As a result, the heat transferred during the processing to the flexible material via the workpiece or plate-like material can be dissipated in order to minimize or avoid expansions of or damage to the flexible material by thermal influences.

According to a further advantageous configuration of the invention, provision is made for the lid of the basic housing to have an opening which is designed for supporting the workpiece. In external dimensions, the plate-like material corresponds to the opening of the lid, such that said material is accommodated in a secured position during the processing. Additional retaining elements may preferably be provided in order to secure the plate-like material in a predetermined position.

According to an advantageous configuration of the invention, provision is made for the first and the second supporting surface to be formed from a common flexible material and for them to form a closed space as an air cushion. This closed space is closed off in a media-tight manner. Due to the configuration of such an air cushion, which is very pliant per se on account of the flexible material, the surface conforms completely to the plate-like material. As a result, very good damping can be effected, such that vibrations are not excited in the plate-like material. At the same time, this configuration makes possible independent leveling of the supported plate-like material in a plane perpendicular to the cutting beam.

Provision is preferably made for a flexible insulating fabric to be provided as an air cushion on the closed space formed from flexible material. This preferred insulating fabric protects the flexible material from damage and pronounced heating. This insulating fabric is preferably interchangeable, such that a new insulating fabric can be used after a certain operating period. As soon as a traverse of the beam-catching device is effected after the incorporation of a cutting gap, high temperatures can act on the closed space on account of the energy absorption in the marginal region of the cutting gap, said high temperatures being screened relative to the air cushion by the insulating fabric. At the same time, the flexible insulating fabric provides protection from possible sharp edges, burrs and/or adhering slag parts on produced good parts and remnants.

According to a further advantageous configuration of the closed space designed as an air cushion, provision is made for spacers, which are preferably designed as retaining members, bands or cords, to be provided between the supporting surface and an underside of the closed space. This can ensure that the supporting surface is held essentially parallel to the underside along a large surface. In addition, it is ensured that expansion into the free marginal regions is prevented if the supporting surfaces are not completely covered by the planar material.

According to a further alternative configuration, provision is made for one or more spacers, at least in regions along the supporting surface, to be capable of being reduced in distance from the supporting surface or the underside. For example, given appropriate selection of the spacers, this enables a supporting surface to assume a wavelike contour. This produces clearance spaces between the supported plate-like material and the closed space, such that a loading and unloading unit, such as a rake for example, can reach underneath the plate-like material, as a result of which automatic loading and unloading of the plate-like material is made possible.

A beam-catching device is provided between the first and the second supporting surface, the opening of which beam-catching device, for receiving the downwardly discharging beam during the processing of the plate-like material, lies essentially in the plane of the supporting surfaces, and the housing extends toward the closed space and is surrounded by the flexible insulating fabric. As a result, the beam-catching device is virtually embedded in the air cushion. The insulating fabric between the beam-catching device and the air cushion ensures that the air cushion is not damaged by heat.

Provision is preferably made for a compensating element to be provided opposite the beam-catching device on the underside of the closed space designed as an air cushion, said compensating element corresponding to the beam-catching device. This compensating element is preferably coupled to the beam-catching device, such that the length of the air cushion surface on the top side and underside of the air cushion is the same size and the fastenings of the spacers at the tcp and the bottom are preferably opposite one another.

According to a further advantageous configuration of the invention, provision is made for a transport device to be provided for displacing the flexible material during the traverse of the beam-catching device, by means of which transport device the beam-catching device can be moved relative to the static closed space. This makes possible a movement of the beam-catching device in the X direction in a simple manner.

The transport device is preferably designed as a circulating, in particular driven, band, by roller or ball bearings, or as a roller or bead mat. This transport device, which is provided on the beam-catching device, permits an independent movement of the beam-catching device in the air cushion. As a result, the individual sections of the flexible material can be passed through beneath the beam-catching device in a protective manner, the beam-catching device, during the traverse movement, remaining embedded completely in the closed space designed as an air cushion. The compensating element is preferably coupled to the beam-catching device. Transport devices may likewise be provided in this compensating element.

According to a further advantageous configuration of the invention, provision is made for sliding elements, which are preferably provided with a sliding coating or are acted upon by compressed air for forming an air film, to be provided between the sections of the transport device which run in opposite directions, said transport device at least partly surrounding the beam-catching device. This enables the friction to be reduced and therefore enables the smooth running and traverse speed to be increased.

The sliding elements can preferably extend right into the supporting plane of the plate-like material and bear against the underside of the plate-like material. As a result, the friction during the movement of the beam-catching device can be reduced. These sliding elements may in particular have air nozzles or a sliding coating and also drive rollers.

The flexible insulating fabric is provided such as to be displaceable in the opposite closed space. As a result, additional transport of the plate-like material can be provided.

According to a further alternative embodiment of the invention, provision is made for the first and the second supporting surface to each be formed by a space closed as an air cushion. As a result, the air cushion is of two-piece design, such that separate activation is made possible for each supporting surface.

According to a further advantageous configuration of the invention, provision is made for the first and the second supporting surface to each be covered by a flexible insulating fabric. This can achieve the advantage that the flexible insulating fabrics of the first and the second supporting surface can be moved separately from one another relative to the respective air cushion. As a result, the degree of automation can be increased by, for example, a flexible insulating band being moved out into a loading or unloading position in order to accommodate a planar material, which is then transferred via the flexible insulating fabric into a working position relative to the cutting head.

According to a further advantageous configuration of the invention, provision is made for the first and the second air cushion to each comprise an air cushion store which is preferably provided on both sides of the beam-catching device. Adaptation of the size of the first and the second supporting surface as a function of the displacement position of the beam-catching device can be provided by such air cushion stores. At the same time, a flat supporting surface of the supporting table for the plate-like material can be maintained in an intended plane.

The air cushion unit preferably has at least one deflection unit and in particular a winding unit for the flexible insulating fabric. As a result, reliable accommodation of the plate-like material in the region of an opening of the beam-catching device can be provided. At the same time, the flexible insulating fabric can be provided as a transport device for the plate-like material. In particular, tension in the flexible insulating fabric can be maintained by the winding unit.

An extension of the flexible insulating fabric is preferably used as a transport band at least at one end of the first or second supporting surface in order to be usable in addition to the shortening of the spacers for the loading and unloading of the plate-like material.

The first and the second air cushions are preferably connected to one another by a connecting line. This can automatically provide for pressure compensation during the change in the size of the supporting surface and thus in the volume of the air cushion.

The invention and further advantageous embodiments and developments of the same are described and explained in more detail below with reference to the examples shown in the drawings. The features to be gathered from the description and the drawings can be used according to the invention individually on their own or in any desired combination.

DETAILED DESCRIPTION

Figure 1:
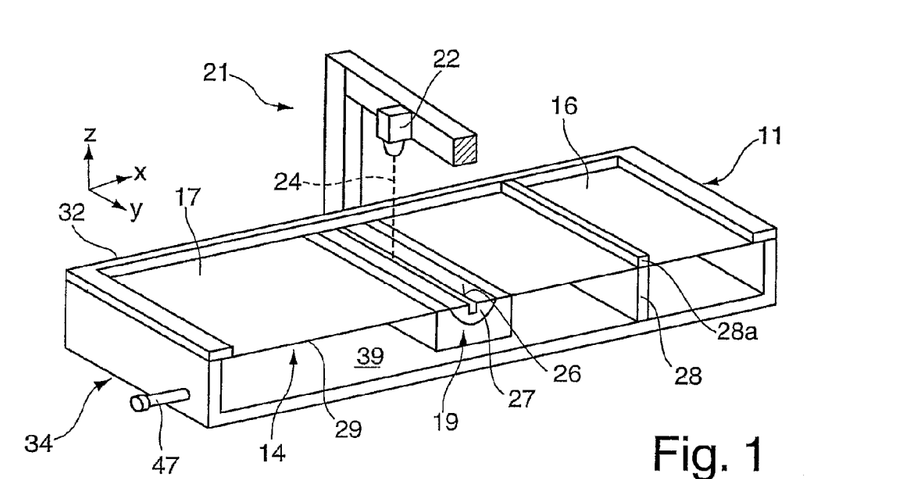
FIG. 1 shows a perspective illustration of a first embodiment of the device according to the invention.

A device 11 for supporting a workpiece or plate-like material 12 is shown in perspective in FIG. 1. The device 11 comprises a supporting table 14 which is formed from a first and a second supporting surface 16, 17. The device 11 is part of a machine bed (not shown in any more detail) or forms a machine bed of a processing machine 21, in particular of a laser cutting machine or flame cutting machine. To process a plate-like material 12 on the supporting table 14, a cutting beam 24 is directed onto the plate-like material 12 via a cutting head 22. The cutting beam 24 discharges on an underside of the workpiece 12 and enters a housing 27 of a beam-catching device 19 via a line-like opening 26. The beam-catching device 19, which is traversable in the X direction, is provided between the first and the second supporting surface 16, 17. For the processing of the entire plate-like material 12, the cutting head 22 is traversable in the Y direction in addition to the X direction. The beam-catching device 19 is coupled to the cutting head 22 with respect to its movements in the X direction. During the traverse of the beam-catching device 19 in or against the X direction, the first supporting surface 16 and the second supporting surface 17 correspondingly become larger or smaller.

The first and the second supporting surface 16, 17 are formed by a continuous flexible material 29. This flexible material 29 may be formed by a thin steel foil, a composite foil of steel-reinforced rubber and/or fiber materials. Furthermore, a hardened or stainless metal foil and a metal foil adhesively bonded in several layers may be provided. In addition, multi-layer foils having a metallic covering layer and organic or inorganic intermediate layers, metal foils having laterally fastened magnetic strips or magnetic layers, metallic multi-layer foils having, for example, a magnetic core and nonmagnetic stainless covering layers, organic films having inorganic or organic fabric inlays, in particular PTFE films having a glass-fiber fabric inlay or aramid-fiber fabric inlay or the like may be provided.

A basic housing 34 and the flexible material 29 form a closed space 39 in which an internal pressure is built up. Sagging or at least slight sinking of the supporting surface 16, 17 is prevented by this internal pressure, in particular in the central region of the respective supporting surface 16, 17.

An internal pressure is generated in the closed space 39 via a feed line 47 which is connected to a compressor (not shown in any more detail) or compressed-air supply point. The internal pressure is regulated by a controller which increases the prevailing internal pressure by a pressure-measuring instrument and at the same time processes data of the plate-like material 12, such that the internal pressure can be adapted to the processing situation. As a result, plane-parallel bearing of the plate-like material 12 on the supporting table 14 and therefore equilibrium between internal pressure and load bearing capacity can be achieved. A threshold value can preferably be stored in the controller, such that pressure regulation is effected starting from a minimum load to be carried by the supporting table 14. In the case of thick or heavy plates, a readjustment is provided, whereas uniform pressurizing can be provided for in the case of thinner plate-like materials.

Furthermore, provision may advantageously be made for a traversable wall 28 to be provided in the case of plate-like materials which do not completely cover the supporting surface 16, 17, by means of which wall 28 the supporting surface 16, 17 not covered by the plate-like material 12 is shortened or delimited. This traversable wall 28 is traversable, for example, parallel to the beam-catching device 19. Furthermore, this traversable wall 28 makes sure that the region which is not covered by the plate-like material 12 does not buckle and that plane-parallel bearing of the plate-like material 12 relative to the supporting surfaces 16 and 17 is achieved. The traversable wall 28 has a seal relative to the underside of the flexible material 29, this seal being described in more detail as lateral seal, for example with respect to FIGS. 2 to 5. The flexible material 29 is positioned via a traversable cover section 28a relative to the traversable wall 28 and can be traversed together with the latter, such that the flexible material 29 rests on an end face of the traversable wall 28 and is held, for example, by magnets relative to this wall 28. As a result, the interior space 39 is shortened and acted upon by an internal pressure. An atmospheric pressure is present between the traversable wall section 28 and the side wall 33.

To produce an internal pressure, a closed space 39 is necessary, which, however, does not have to be 100 percent airtight. Minor leakages can be compensated for by subsequently fed compressed air, the functioning for sealing the supporting table 14 over a large area being retained.

In the embodiment of the device 11 shown in FIG. 1, the flexible material 29 is deflected under the beam-catching device 19, such that a continuous wave is formed. This configuration is described below in more detail with respect to FIG. 4.

Figure 2:
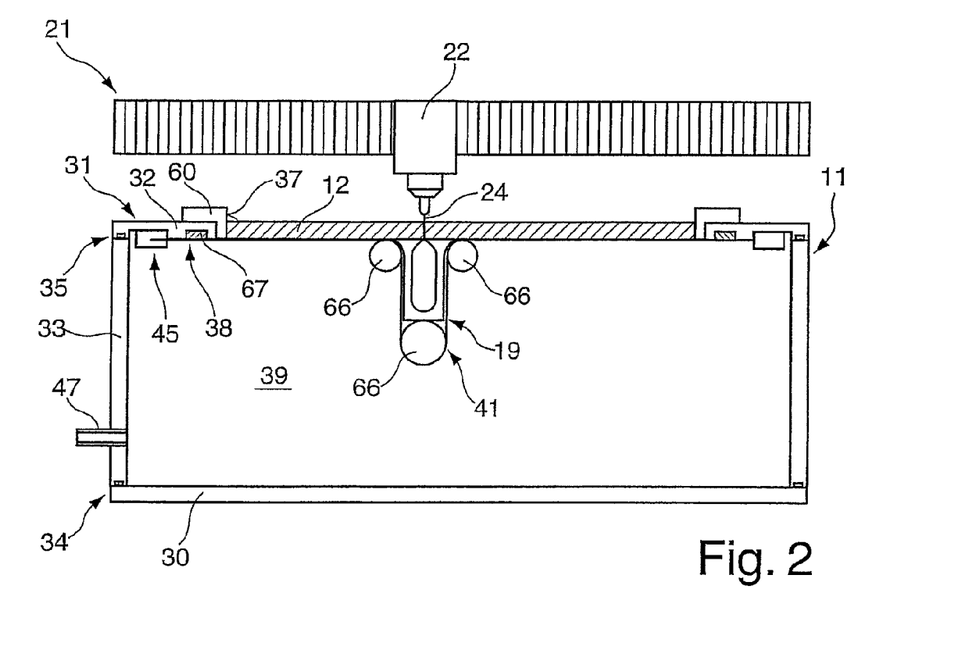
FIG. 2 shows a schematic sectional illustration of a further embodiment of the device according to the invention with respect to FIG. 1.
Figure 3:
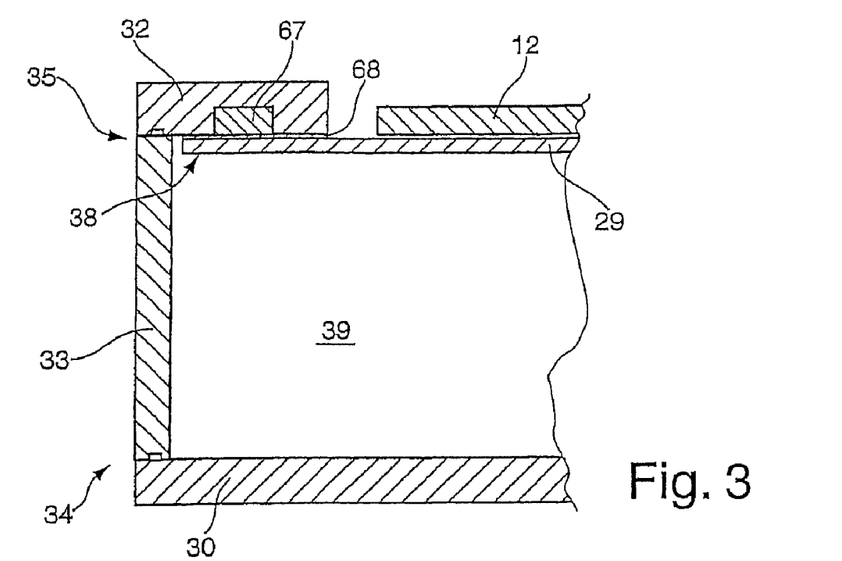
FIG. 3 shows a schematically enlarged sectional illustration of a laterally arranged, detachable seal of the device according to the embodiment in FIG. 1.

A schematic sectional illustration of a further embodiment of the device 11 with respect to FIG. 1 is shown in FIG. 2. The basic housing 34 is of multi-piece design and comprises a base 30, housing side walls 33 and at least one lid 32, which are tightly connected to one another by static seals 35. Such a static seal may be formed by a welded, adhesively bonded or clamped construction. For example, as shown in the exemplary embodiment, seals, such as, for example, foam rubber gaskets, cord seals or the like, may be provided in grooves.

Furthermore, to form the closed space 39, it is necessary to provide a lateral seal 38 of the flexible material 29 relative to the basic housing 34. This lateral seal 38 is preferably provided at end faces 31 at least in a displaceable manner, in particular also in a detachable manner. As a result, a tensioning device 45 can tension the flexible material 29 in the X direction, thereby providing for support with respect to the load bearing capacity. At the same time, thermal expansions can be compensated. The tensioning device 45 is only shown schematically and can apply a band tension via rollers, eccentrics or the like.

The lid 32 has an adapter piece 60 which can act on the lid 32. This adapter piece 60 or the lid 32 itself preferably has a slightly sloping end face 37 in order to be able to insert the plate-like material 12 in a simple manner and ensure correct positioning on the supporting table 14.

FIG. 2 shows an alternative embodiment to FIG. 1 in the deflection region 41. The formation of a continuous wave is retained in principle, but deflection rollers 66 are provided which permit a deflection of the flexible material 29 so that the beam-catching device 19 is designed to be traversable in the X direction. These deflection rollers 66 may comprise a separate drive. Alternatively, a drive according to an embodiment shown in FIGS. 6 and 7 may also be provided.

A lateral seal 38 of the flexible material 29 in the basic housing 34 is designed to be detachable on account of the traversable beam-catching device 19. This detachable seal is shown in more detail in FIG. 3. The flexible material 29 bears against the underside of the lid 32. This is assisted by the internal pressure applied in the closed space 39. In addition, in the case of a flexible material 29 which has magnetic properties, magnetic adhesion can be provided for by magnets 67 provided in the lid 32. Flocking 68 may be provided on the underside of the lid 32 and/or on a top side of the flexible material 29, which is covered by the lid 32, in order to provide a tight arrangement. Alternatively, PTFE sliding seals, graphite elements, a hook and loop fastener strip or the like may be arranged. As a result, the marginal region can be arranged in both the X direction and the Y direction of the flexible material 29 and so as to be sealed relative to the lid 32 in a rest position.

Figure 4:
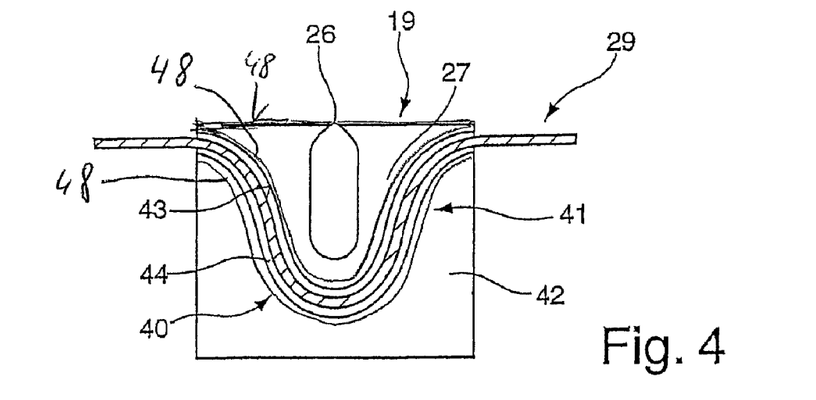
FIG. 4 shows a schematic sectional illustration of a dynamic seal in the deflection region of the device according to the embodiment in FIG. 1.

A "dynamic seal" 40 is provided in the deflection region 41 in FIG. 4, said seal 40 being formed along the beam-catching device 19 by the flexible band 29, which circulates as a continuous wave. In the embodiment shown in FIG. 4, a forming element 42 is assigned to the beam-catching device 19 and forms, at least in the respective marginal region of the beam-catching device 19, a gap 44 relative to the outer contour 43 of the beam-catching device 19. In the marginal region, at the forming element 42 and/or at the outer contour 43 of the beam-catching device 19, the gap 44 has a seal 46, such as, for example, flocking, a PTFE sliding seal or graphite elements, as a result of which a tight arrangement of a flexible material 29 running through is achieved. In addition, low-friction elements 48 can be provided, e.g., as shown in FIG. 4, between the forming element 42 and the flexible band 29 and/or between an outer contour 43 of the beam-catching device 19 and the deflected flexible material 29 and/or between an end face of the beam-catching device 19 and a plate-like material 12 resting on the first supporting surface and the second supporting surface.

Figure 5:
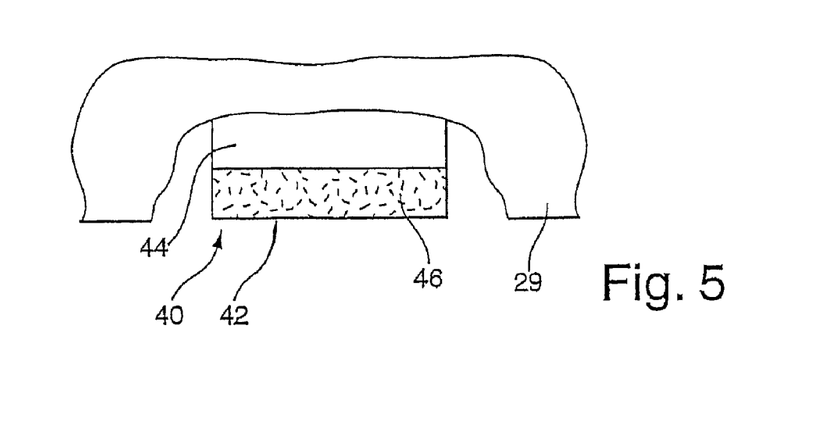
FIG. 5 shows a schematic partial view of a guide element, arranged on the beam-catching device, for forming a dynamic seal according to FIG. 4.

Shown in FIG. 5, for example, is a partial view of the forming element 42 with the seal 46, which is likewise provided opposite the gap 44 at the outer contour 43 of the beam-catching device 19.

Figure 6:
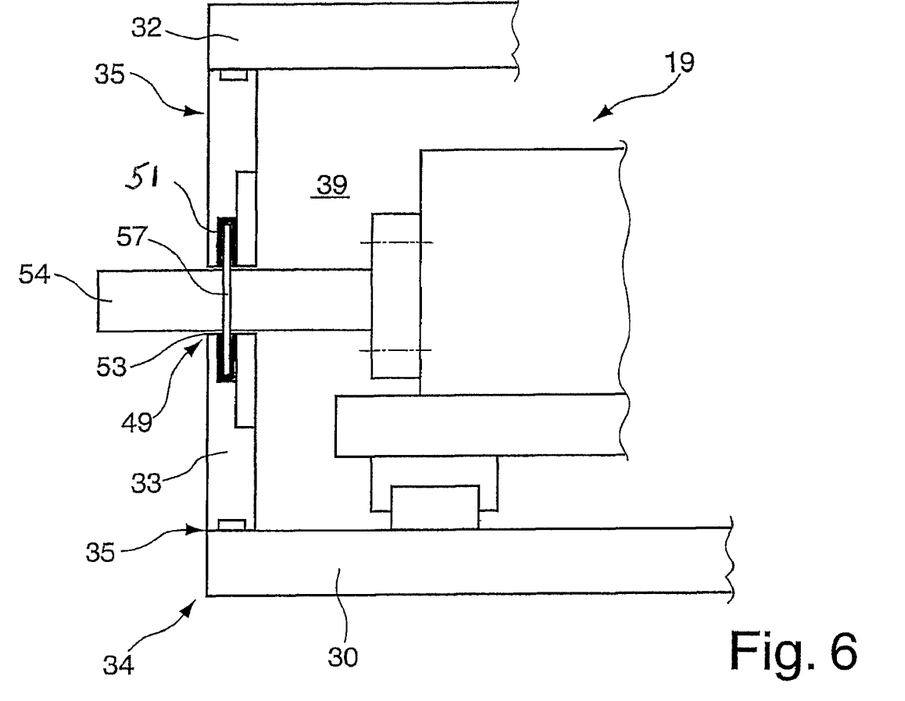
FIG. 6 shows a schematic sectional illustration of a lateral rolling band seal for the traversable arrangement of the beam-catching device.
Figure 7:
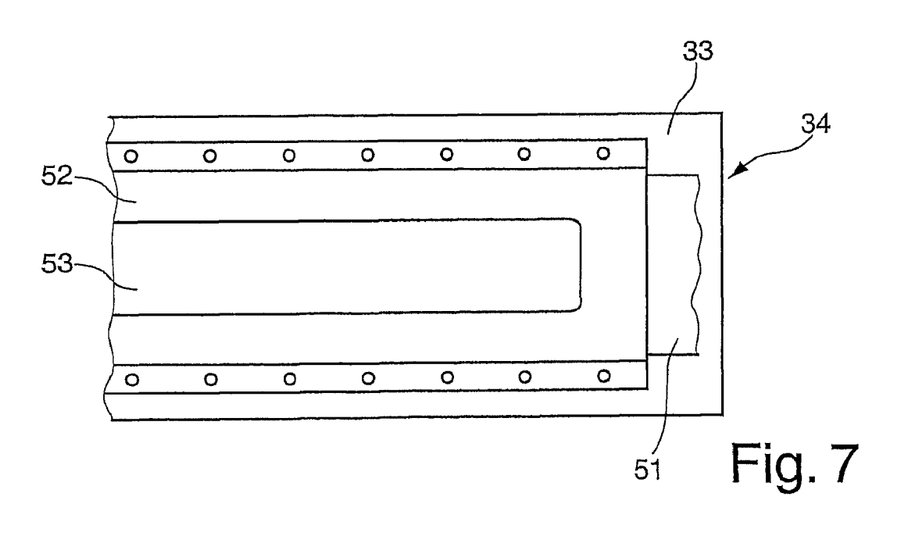
FIG. 7 shows a side view of the rolling band seal according to FIG. 6.

Shown schematically in FIGS. 6 and 7 is a rolling band seal 49 which serves as a mechanical coupling and sealing point. This seal comprises a band-shaped body 51 which is guided in a preferably flocked slot 52, a lateral guide gap 53 being closed by the band-shaped body 51. An actuating element 54 is passed through the lateral guide gap 53 in order to couple, for example, the beam-catching device 19 to the movement of the cutting head 22 or its line-like axis or in order to directly drive said beam-catching device 19. The length of the band-shaped body 51 which projects laterally beyond the end of the guide gap 53 can be rolled up.

Figure 8:
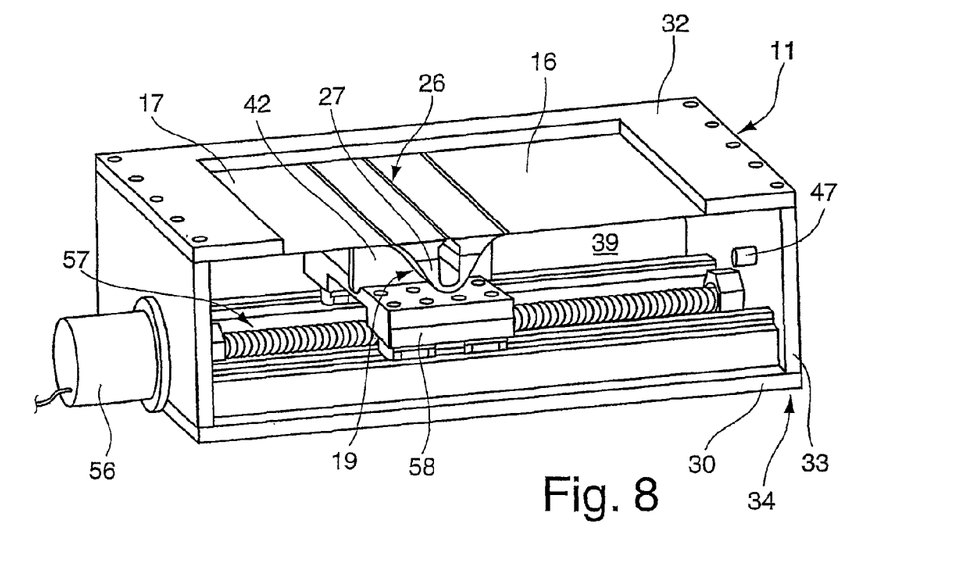
FIG. 8 shows an alternative embodiment of the device according to the invention with respect to FIG. 1.

FIG. 8 shows an alternative embodiment of the device 11 with respect to FIG. 1. In this embodiment, an inner drive element 57 which can be led out of the basic housing 34 is provided for the beam-catching device 19. The drive element 57 is led out of the basic housing 34 via a seal. Outside the basic housing 34, a drive motor 56 drives the drive element 57. A carriage 58 which is traversable by means of the drive element 57 and which is preferably provided on a sliding, roller or ball bearing guide acts on the beam-catching device 19 or on a component 42 for the displacement movement in and against the X direction. Alternatively, provision may be made for a magnetic coupling to be provided for feeding the force transmission into the closed space or into the pressure chamber. The drive element provided may be a drive spindle, a toothed rack, a slide or the like.

For the drive of the beam-catching device 19, provision is preferably made for an overload clutch to be provided between the drive motor 56 and the beam-catching device 19, said overload clutch preventing damage.

So that the beam-catching device 19 can be traversed below the supported plate-like material 12 with lower friction, the beam-catching device 19, on its top side pointing toward the plate-like material 12, preferably has roller elements, brush segments, sliding materials, a sliding coating, a driven band or driven rollers and also holes for forming an air film bed.

During the processing of plate-like material 12 which comprises a smaller size than the opening 36 of the lid 32, the free supporting surface is preferably covered by a covering. This covering may be designed as a roller blind system or as a bar mat or the like which covers the supporting region that is not covered, in order to simulate covering of the entire supporting table. As a result, buckling of the supporting surface that is not covered on account of the internal pressure by the flexible material 29 can be prevented.

As an alternative to the partial covering, provision may be made for a slidable wall to be provided in the closed space 39, said wall being traversable for pressure compensation in the closed space, such that the surface acted upon by pressure corresponds to the surface of the plate-like material 12 which rests on the first and the second supporting surface 16, 17.

In addition, the configuration of the flexible band 29 which forms a pressure chamber with the basic housing 34 ensures that there is no jamming of good parts due to the closed surface of the flexible band 29 during the traverse of the beam-catching device 19.

To provide a basic load bearing capacity, provision is preferably made for the pretension of the flexible band 29 to be increased and/or for lateral clamping of the flexible band 29 relative to the lid 32 to be provided. The lateral mechanical clamping is gradually released or locked again as a function of the traverse distance of the beam-catching device 19. Additionally or alternatively, a web support may be provided, which is formed, for example, by one or more webs which are oriented parallel to the beam-catching device 19 and support the supporting surface 16, 17 from below.

Figure 9:
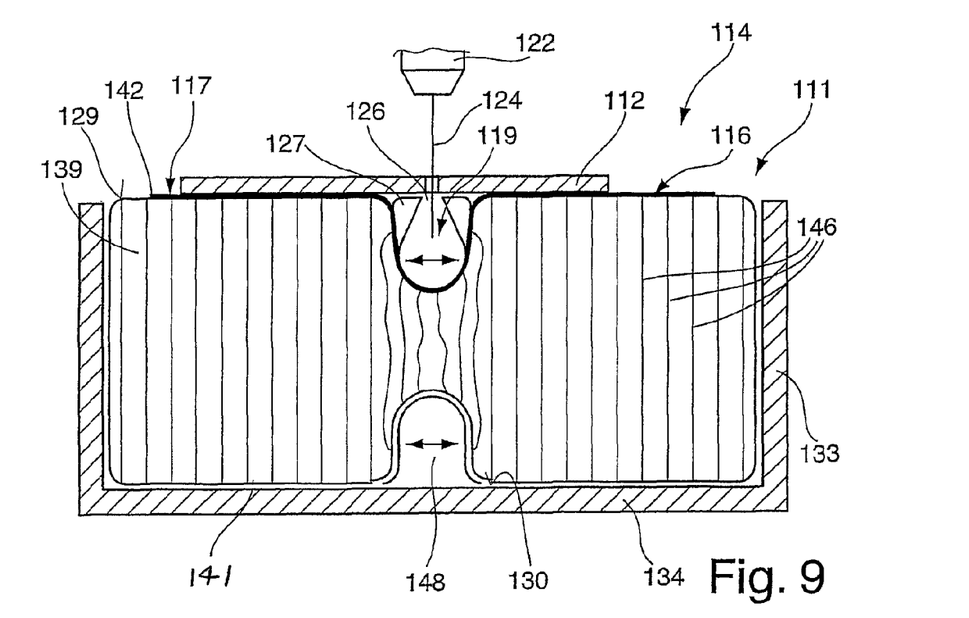
FIG. 9 shows a schematic sectional illustration of an alternative embodiment according to the invention with respect to the device according to FIG. 1, FIGS. 10a-c show schematic side views of transport devices for the beam-catching device of the alternative embodiment according to FIG. 9.

A schematic sectional illustration of an alternative device 111 according to the invention is shown in FIG. 9. This device 111 serves to accommodate a plate-like material 112 which rests on a supporting table 114. The supporting table 114 comprises a first and a second supporting surface 116, 117, between which a beam-catching device 119 is arranged. This device 111 is part of a machine bed or forms a machine bed of a processing machine 121, which in particular is designed as a laser cutting machine or flame cutting machine. A cutting beam 124 is directed onto the plate-like material 112 via a cutting head 122. The cutting beam 124 discharges at an underside of the plate-like material 112 and passes via a line-like opening 126 into a housing 127 of the beam-catching device 119. The beam-catching device 119 can be moved in the X direction and follows the cutting head 122, provided the latter is moved in the X direction in addition to the Y direction.

The first and the second supporting surface 116, 117 are formed from a flexible material 129 which is a component part of a closed space 139, which according to this exemplary embodiment is designed as an air cushion. This air cushion is accommodated in a basic housing 134 and rests with an underside 141 on a base 130 of the basic housing 134. Side wall sections 133 of the basic housing 134 define the extent of the air cushion and at the same time support the end surfaces of the air cushion.

Provided on the closed space 139 is a flexible insulating fabric 142 which extends between the beam-catching device 119 and the closed space 139. Due to this insulating fabric 142, the plate-like material 112 can be moved relative to the closed space 139. The plate-like material 112 preferably rests statically on the insulating fabric 142 and the closed space 139, and the beam-catching device 119 is moved in the X direction by a transport device (e.g., one of the transport devices 144 shown in FIGS. 10a-10c and described below). The flexible material 129 can be arranged tensioned relative to the air cushion.

An internal pressure in the air cushion or closed space 139 can be set and is preferably monitored by a pressure-measuring instrument. A controller for setting and changing the internal pressure may be provided. Provided in the closed space 139 or air cushion are spacers 146 which extend in the interior of the air cushion from an underside 141 up to the supporting surface 116, 117. A flat supporting surface 116, 117 can be created by these spacers 146 in the form of retaining members, bands, cords or the like.

The flexible insulating fabric 142 is formed from heat-resistant and/or tear-resistant material in order to protect the closed space 139 from heat and sharp edges on the good part or remnant.

A compensating element 148 is provided opposite the beam-catching device 119 in order to design the free air cushion surface to be the same size. During the traverse of the beam-catching device 119, the compensating element 148 is moved along at the same time. This may be coupled to the beam-catching device 119 or driven separately.

Figure 10A:
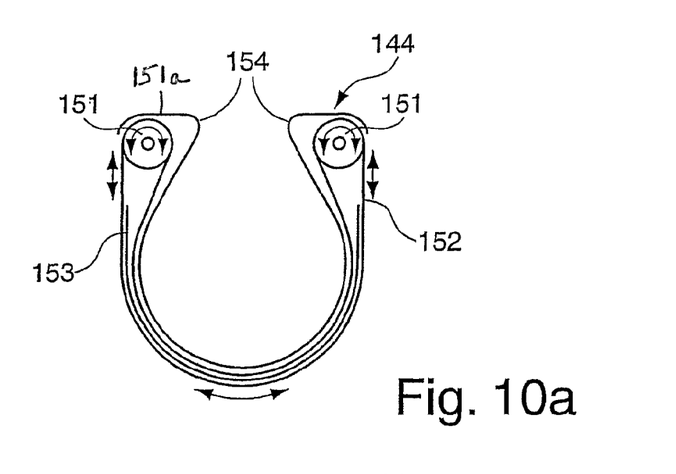
Figure 10B:
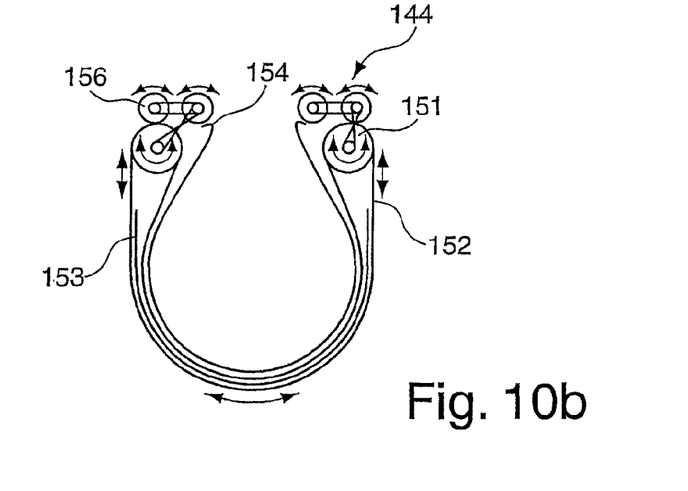
Figure 10C:
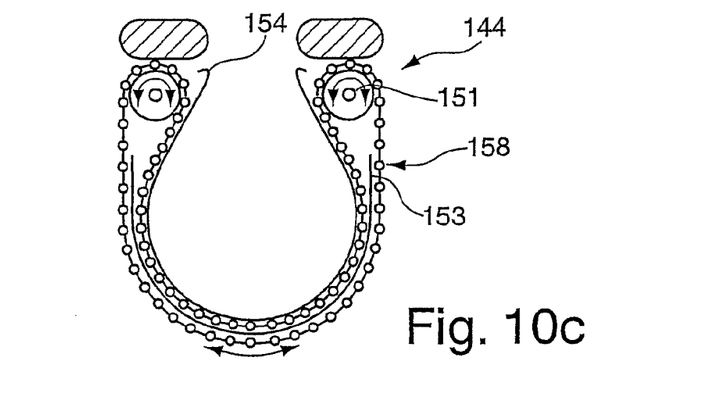

Alternative embodiments of a transport device 144 that may be used, for example, in the device 111 shown in FIG. 9, are shown in FIGS. 10a to 10c. According to a first embodiment, a circulating band 152 is provided which extends below the beam-catching device 119. The circulating band 152 is driven via two deflection rollers 151. A sliding element 153 is provided between the sections of the circulating band 152 that are running in opposite directions (upwards and downwards in FIG. 10a) to separate the sections and prevent damage thereto. In addition, the transport device 144 is screened from the beam-catching device 119 by a further sliding element 154 in order to obtain as small an opening width as possible. On a section 154a pointing toward the underside of the plate-like material 112, this sliding element 154 has a sliding coating, air nozzles or the like (not shown) in order to reduce the friction relative to the plate-like material 112 of the beam-catching device 119. Alternatively, according to FIG. 10b, running rollers 156 may be provided which are simultaneously supported on the underside of the plate-like material 112 and serve to drive the circulating band 152.

Shown in FIG. 10c is a further alternative embodiment in which a roller or bead chain 158 is used. Otherwise, the exemplary embodiments and variants according to FIGS. 10a and 10b may also be provided for a roller chain 158 as transport device 144.

Figure 11:
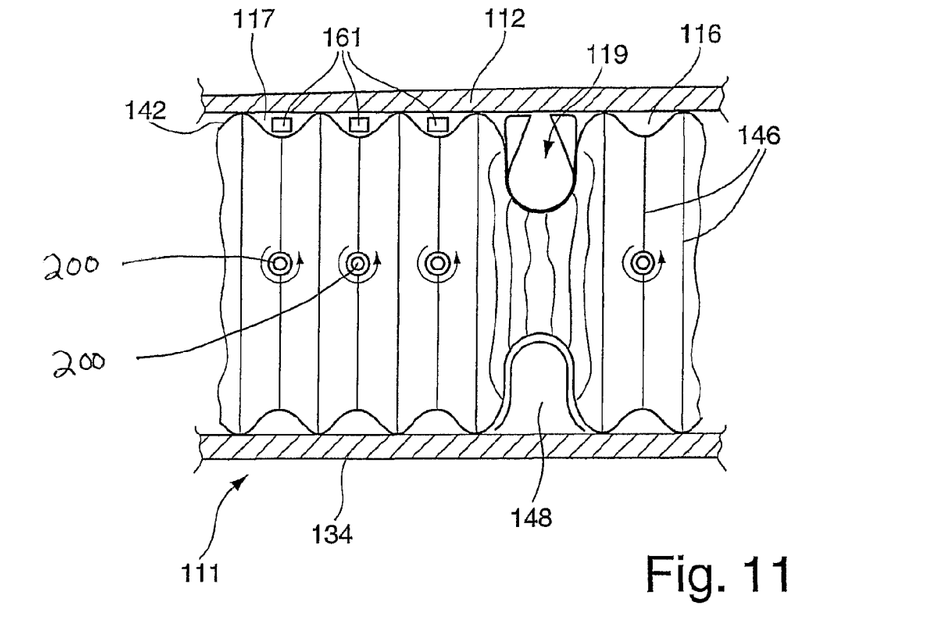
FIG. 11 shows a schematic partial section of the device according to FIG. 9 in a further working position.

A further working position of the device 111 according to FIG. 9 is shown in FIG. 11. The spacers 146 have been shortened by actuating elements 200, every second spacer 146, for example, having been shortened. As a result, the supporting surface 116, 117 has a wavy shape, such that tines 161 of a loading and unloading unit can reach underneath the plate-like material 112 and can remove the plate-like material 112 from the device 111. The actuating elements 200 (e.g., rollers that can be turned in the direction of the arrows in FIG. 9 to lengthen and shorten the spacers 146) can also be activated individually in order to orient the supporting surface 116, 117. The surface of the air cushion is enlarged by the wavelike arrangement of the air cushion surface when the spacers 146 are actuated. In order to allow the surface to be enlarged, provision is made, for example, for the beam-catching device 119 to be capable of being moved out of the air cushion in or against the Y direction, such that a space that is no longer required can thereby be used for forming the wavelike surface. Alternatively, provision may be made for the beam-catching device 119 to be traversable, for example, in the Z direction in an end position in order to achieve the same effect.

Figure 12:
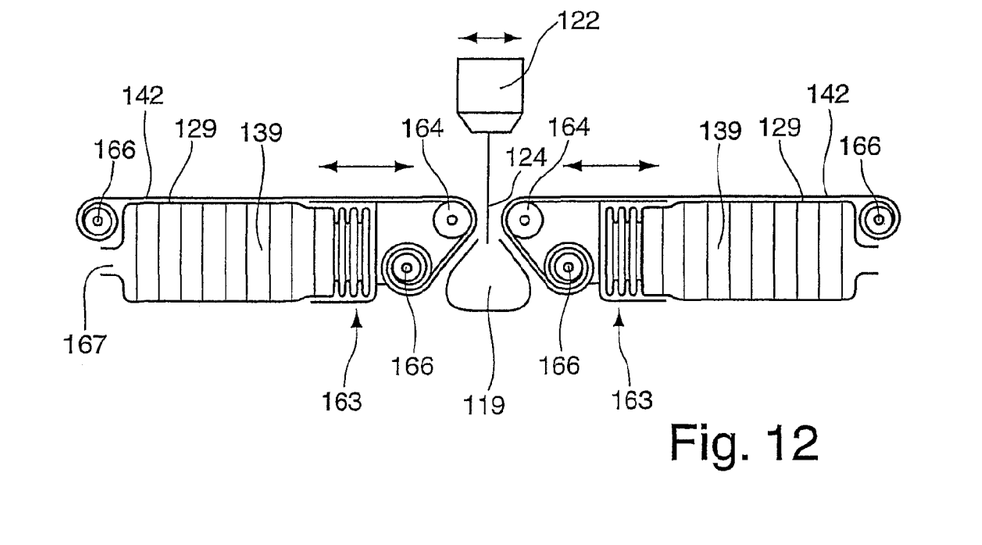
FIG. 12 shows a schematic side view of a further alternative embodiment of the device according to FIG. 9.

An alternative embodiment to FIG. 9 is shown in FIG. 12. In this embodiment, a closed space 139 is provided as air cushion for each supporting surface 116, 117. These closed spaces 139 are each covered by a flexible insulating fabric 142 and form the supporting surface 116, 117. Provided between the beam-catching device 119 and the respective closed space 139 is an air cushion store 163, which, during the traverse of the beam-catching device 119 in the X direction, enables that flexible material 129 of the air cushion which is not required to be accommodated. On the opposite side, the stored flexible material 129 is unfolded in order to form a larger supporting surface.

The air cushion store 163 preferably accommodates a deflection roller 164 for the flexible insulating web 142 in order to position the latter close to the line-like opening 126 of the housing 127 and keep a gap small relative to the beam-catching device 119. In addition, a winding unit 166 is provided in order to wind up the flexible insulating fabric 142 during the change in size of the supporting surfaces 116, 117.

The winding unit 166 is provided opposite the air cushion store 163 and allows further functions to be realized, in particular for automation or for loading and unloading. The flexible insulating fabric 142 enables the good parts and/or remnants to be received in a loading and an unloading position.

For simple pressure compensation during the traverse of the beam-catching device 119, the two closed spaces 139 are connected to one another by a pressure compensation line 167. This line 167 preferably has a low flow resistance. In addition, a respective internal pressure in the closed space 139 can be controlled and built up or set via this pressure compensation line 167.

All the aforesaid features are each essential to the invention on their own and can be combined with one another in any desired manner.

The invention claimed is:

1. A device for supporting plate-like materials for at least one separating process using a cutting beam to separate the plate-like material, the device comprising:
- a first supporting surface and a second supporting surface which together form a supporting table for supporting the plate-like material, wherein each of the first supporting surface and second supporting surface are formed from a flexible material;
- a beam-catching device defining a line-like opening, wherein the beam-catching device is arranged between the first and the second supporting surfaces and is configured to be traversable in an X direction;
- a basic housing having a top region that is open, wherein the flexible material comprises a band whose outer marginal region is configured and arranged to seal the top region of the basic housing; and
- a lateral seal configured to run in one or both of the X direction and a Y direction to detachably seal the flexible material against the top region of the basic housing, wherein the basic housing and the flexible material together form component parts of a body that defines at least one closed space, wherein the body comprises an inlet through which a medium is delivered to build up an internal pressure within the closed space.

2. The device of claim 1, wherein the internal pressure in the closed space is detected, and the device further comprises a pressure regulator configured to set the internal pressure at least as a function of the plate-like material and of the thickness of the plate-like material.

3. The device of claim 1, wherein the flexible material is guided and deflected below the beam-catching device along a gap formed by a forming element arranged on the beam-catching device to form a deflection region of the flexible material relative to the basic housing.

4. The device of claim 3, wherein the low-friction elements are provided in any one or more of the group of locations consisting of (i) between the forming element and the flexible material, (ii) between an outer contour of the beam-catching device and the flexible material, and (iii) between an end face of the beam-catching device and a plate-like material resting on the first supporting surface and the second supporting surface.

5. The device of claim 1, wherein the beam-catching device comprises a housing having a bell-shaped outer contour.

6. The device of claim 1, wherein the basic housing comprises a multi-piece basic housing wherein pieces of the multi-piece basic housing are sealed together by a static seal.

7. The device of claim 6, wherein the static seal comprises a welded, adhesively bonded, or clamped construction.

8. The device of claim 1, wherein end faces of the flexible material are fastened to the basic housing under pretension, by a tensioning device.

9. The device of claim 3, wherein the flexible material is arranged in the deflection region to form a dynamic seal along the beam-catching device within the basic housing.

10. The device of claim 9, wherein the dynamic seal comprises a flock bed.

11. The device of claim 1, further comprising a drive unit arranged in the closed space, wherein said drive unit drives the beam-catching device or components arranged thereon.

12. The device of claim 1, further comprising a drive element that acts on the beam-catching device or a component arranged thereon, or a guide element that acts on the beam-catching device or a component arranged thereon, or both the drive element and the guide element, wherein the drive element or the guide element, or both are driven by a drive motor arranged outside the closed space.

13. The device of claim 1, further comprising a lateral rolling band seal which closes off a lateral guide gap for the traverse of the beam-catching device.

14. The device of claim 1, wherein the supporting surfaces of the closed space are cooled from inside is utilizing a cooling technique selected from the group consisting of gas circulation, spray cooling, and water flooding.

15. The device of claim 1, wherein the basic housing has a lid with an opening which is provided for supporting the plate-like material.

16. The device as claimed in claim 1, characterized in that the first supporting surface and the second supporting surface are formed from a common piece of the flexible material which also forms the closed space as an air cushion.

17. The device as claimed in claim 16, characterized in that a flexible insulating fabric is disposed on a surface of the flexible material opposite the closed space.

18. The device as claimed in claim 16, characterized in that spacers are provided between the supporting surface and an underside of the closed space.

19. The device as claimed in claim 18, characterized in that the spacers are designed as retaining members, bands or cords.

20. The device as claimed in claim 18, characterized in that one or more spacers, at least in regions along the supporting surface, are shortened relative to other spacers, to reduce the distance between the supporting surface and the underside in selected areas.

21. The device as claimed in claim 16, characterized in that the opening of the beam-catching device lies essentially in the plane of the first supporting surface and the second supporting surface.

22. The device as claimed in claim 21, characterized in that a compensating element is assigned opposite the beam-catching device on the underside of the closed space, said compensating element corresponding to the housing of the beam-catching device and being traversable together with the beam-catching device.

23. The device as claimed in claim 16, characterized in that a transport device is provided for displacing the flexible material during the traverse of the beam-catching device.

24. The device as claimed in claim 23, characterized in that the transport device comprises a circulating band.

25. The device as claimed in claim 24, characterized in that the band is driven by roller or ball bearings, or as a roller or bead mat.

26. The device as claimed in claim 20, characterized in that sliding elements are provided between sections of the transport device which run in opposite directions, said transport device partly surrounding the beam-catching device.

27. The device as claimed in claim 26, characterized in that the sliding elements are provided with a sliding coating or are acted upon by compressed air for forming an air film.

28. The device as claimed in claim 16, characterized in that the flexible insulating fabric is arranged as to be displaceable relative to the closed space.

29. The device as claimed in claim 16, characterized in that the first supporting surface and the second supporting surface are each formed by an upper surface of an air cushion, the air cushions defining a first closed space and a second closed space.

30. The device as claimed in claim 29, characterized in that the first supporting surface and the second supporting surface are each covered by a flexible insulating fabric.

31. The device as claimed in claim 29, characterized in that the first closed space and the second closed space each comprise an air cushion store which is arranged on both sides of the beam-catching device.

32. The device as claimed in claim 16, characterized in that an extension of the flexible insulating fabric is provided at least at one end of the first or second supporting surface.

33. The device as claimed in claim 29, characterized in that the first closed space and the second closed space connected to one another by a pressure compensation line.

* * * * *

UNITED STATES PATENT AND TRADEMARK OFFICE
CERTIFICATE OF CORRECTION

| | | |
|---|---|---|
| PATENT NO. | : 8,028,977 B2 | Page 1 of 1 |
| APPLICATION NO. | : 12/043448 | |
| DATED | : October 4, 2011 | |
| INVENTOR(S) | : Martin Blaser et al. | |

It is certified that error appears in the above-identified patent and that said Letters Patent is hereby corrected as shown below:

On column 14, line 26, Claim 14, after "inside" delete "is".

Signed and Sealed this
Third Day of January, 2012

David J. Kappos
*Director of the United States Patent and Trademark Office*